US009606800B1

(12) United States Patent
Hameenanttila et al.

(10) Patent No.: US 9,606,800 B1
(45) Date of Patent: Mar. 28, 2017

(54) METHOD AND APPARATUS FOR SHARING INSTRUCTION SCHEDULING RESOURCES AMONG A PLURALITY OF EXECUTION THREADS IN A MULTI-THREADED PROCESSOR ARCHITECTURE

(71) Applicant: Marvell International Ltd., Hamilton (BM)

(72) Inventors: Tom Hameenanttila, Phoenix, AZ (US); R. Frank O'Bleness, Tempe, AZ (US); Sujat Jamil, Gilbert, AZ (US); Joseph Delgross, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 740 days.

(21) Appl. No.: 13/836,145

(22) Filed: Mar. 15, 2013

Related U.S. Application Data

(60) Provisional application No. 61/611,382, filed on Mar. 15, 2012.

(51) Int. Cl.
*G06F 9/30* (2006.01)
*G06F 11/07* (2006.01)
(Continued)

(52) U.S. Cl.
CPC ........ *G06F 9/30145* (2013.01); *G06F 9/3836* (2013.01); *G06F 9/3851* (2013.01);
(Continued)

(58) Field of Classification Search
CPC .... G06F 9/3836; G06F 9/3851; G06F 9/3867; G06F 9/4881; G06F 9/5061; G06F 11/0754
See application file for complete search history.

(56) References Cited

U.S. PATENT DOCUMENTS 6,247,121 B1 * 6/2001 Akkary ................. G06F 9/3834
712/216
7,519,796 B1 * 4/2009 Golla .................... G06F 9/3814
712/225
(Continued)

OTHER PUBLICATIONS

Nick Stam, Inside the P6, Sep. 12, 1995, PC Mag, p. 120.*
(Continued)

*Primary Examiner* — Aimee Li
*Assistant Examiner* — Courtney Carmichael-Moody

(57) ABSTRACT

A microprocessor includes a front end module and a schedule queue module. The front end module is configured to retrieve first instructions, corresponding to a first thread, from an instruction cache, and retrieve second instructions, corresponding to a second thread, from the instruction cache. The front end module is also configured to decode the first instructions into first decoded instructions, and decode the second instructions into second decoded instructions. The schedule queue module is configured to selectively store the first decoded instructions and the second decoded instructions from the front end module and, for each stored decoded instruction, selectively issue the stored decoded instruction to an execution module. The schedule queue is further configured to reject storing an additional one of the first decoded instructions from the front end module in response to a count of the stored first decoded instructions in the schedule queue module exceeding a threshold.

20 Claims, 11 Drawing Sheets

(51) Int. Cl.
*G06F 9/38* (2006.01)
*G06F 9/50* (2006.01)
*G06F 9/48* (2006.01)

(52) U.S. Cl.
CPC .......... *G06F 9/3867* (2013.01); *G06F 9/4881* (2013.01); *G06F 9/5061* (2013.01); *G06F 11/0754* (2013.01)

(56) References Cited

U.S. PATENT DOCUMENTS

| | | | | |
|---|---|---|---|---|
| 8,006,073 | B1* | 8/2011 | Ali | G06F 9/3851 712/220 |
| 8,335,911 | B2* | 12/2012 | Golla | G06F 9/3851 712/220 |
| 8,438,369 | B2* | 5/2013 | Marden | G06F 9/3851 712/220 |
| 8,661,230 | B2* | 2/2014 | Alexander | G06F 9/30098 712/220 |
| 2004/0215933 | A1* | 10/2004 | Nguyen | G06F 9/3017 712/200 |
| 2004/0215944 | A1* | 10/2004 | Burky | G06F 9/3851 712/244 |
| 2008/0163230 | A1* | 7/2008 | Latorre | G06F 9/524 718/104 |
| 2010/0131783 | A1* | 5/2010 | Weng | G06F 1/3203 713/320 |
| 2011/0185125 | A1* | 7/2011 | Jain | G06F 12/0813 711/122 |
| 2013/0205118 | A1* | 8/2013 | Buyuktosunoglu | G06F 9/3851 712/206 |

OTHER PUBLICATIONS

Tullsen, Dean. M. et al.; Simultaneous Multithreading: Maximizing On-Chip Parallelism; Jun. 1995; 12 pages.
Thomadakis, Michael E.; The Architecture of the Nehalem Processor and Nehalem-EP SMP Platforms; Mar. 17, 2011; 49 pages.
Wikipedia; Simultaneous Multithreading; Jan. 31, 2013; 5 pages.
Eggers, Susan J. et al.; Simultaneous Multithreading: A Platform for Next-Generation Proecssors; IEEE; 1997; 8 pages.
Wikipedia; Out-of-Order Execution; Jan. 1, 2013; 4 pages.
Shimpi, Anand Lal; Intel's Hyper-Threading Technology: Free Performance?; AnandTech; Jan. 14, 2002; 3 pages.
Shimpi, Anand Lal; Intel's Sandy Bridge Architecture Exposed; AnandTech; Sep. 14, 2010; 12 pages.

* cited by examiner

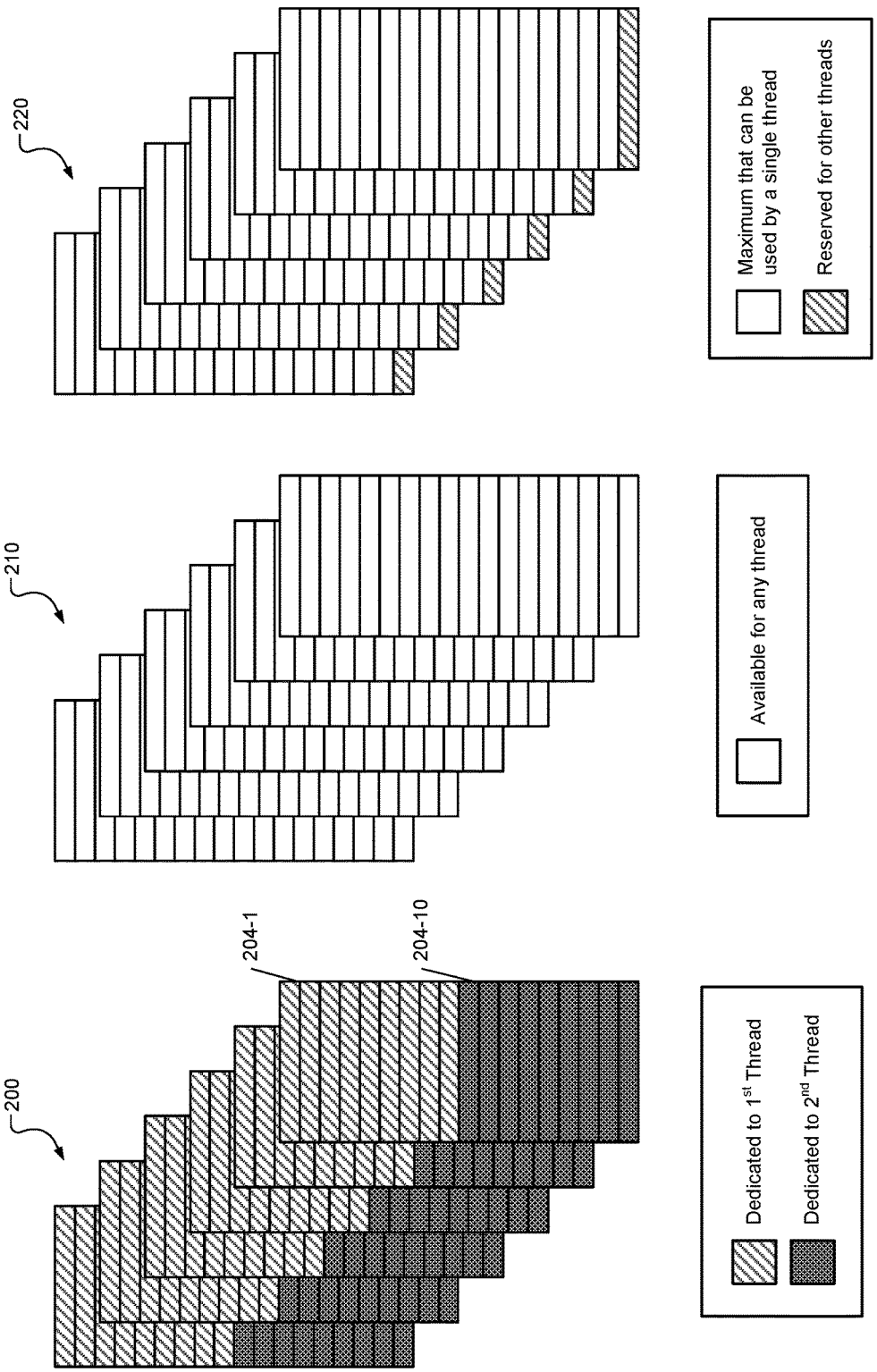

METHOD AND APPARATUS FOR SHARING INSTRUCTION SCHEDULING RESOURCES AMONG A PLURALITY OF EXECUTION THREADS IN A MULTI-THREADED PROCESSOR ARCHITECTURE

CROSS-REFERENCE TO RELATED APPLICATION

This claims the benefit of U.S. Provisional Application No. 61/611,382, filed on Mar. 15, 2012. The entire disclosure of the application referenced above is incorporated herein by reference.

FIELD

The present disclosure relates to resources usage in multi-threaded processor architectures, and more particularly to partition-free sharing of instruction scheduling resources among execution threads.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In FIG. 1A, a graphical illustration of execution opportunities in a superscalar processor shows five consecutive cycles. Each cycle of the processor corresponds to one clock period of the processor clock. Because the processor is superscalar, multiple instructions can be executed in each clock cycle, indicated in FIG. 1A by four columns. However, in virtually all modern processors, the datapath is pipelined, meaning that some or all instructions require multiple clock cycles to be completed.

In standard software programming, the results of one instruction may be relied upon by the following instruction. This may force the processor to wait to execute the following instruction until the previous instruction is partially or fully completed. There are some instructions that do not depend on each other, and for example, may only depend on instructions completed in the past. These instructions can theoretically be executed in parallel, since each instruction does not require the output of the other. This is called instruction level parallelism.

In the example FIG. 1A, three execution slots in cycle 1 are used for execution. This means that the processor was able to identify instruction level parallelism and issue the three instructions at once. However, note that the processor was unable to identify a fourth instruction to execute in parallel. This represents wasted processing capability, which impacts performance and may also impact power consumption. In cycle 2, the processor is unable to issue any instructions; for example, subsequent instructions may require information from the instructions issued in cycle 1, from instructions issued in previous cycles, or from a storage location, such as level two cache, that has a multi-cycle latency.

In cycle 3, a single instruction is issued, and in cycle 4, two instructions are issued. Once again, in cycle 5, the processor is unable to issue any instructions. As can be seen in FIG. 1A, for this particular example, the limited instruction level parallelism causes many of the processor cycles to be wasted.

In FIG. 1B, an example processor offering fine-grained multithreading is shown. A first thread in this example uses the same instructions, which therefore have the same dependencies as the instructions in FIG. 1A. However, a second thread may be executed in cycles where the first thread is not executing. As a result, in cycle 2, two instructions are issued from a second thread, while in cycle 5, three instructions are issued from the second thread. The second thread may be another program or may be a second thread of the same program.

This fine-grained multithreading exploits thread level parallelism, in which instructions from multiple threads do not depend on each other's outputs, and therefore other threads may continue executing while a first thread is waiting for instructions to complete. However, there is still a significant amount of waste in terms of execution opportunities.

In FIG. 1C, a processor offering simultaneous multithreading is shown with the same example instructions from the first thread. In FIG. 1C, note that instructions from the second thread can be issued in the same cycles that instructions from the first thread are issued, which is why such a scheme is called simultaneous multithreading. The instructions for the second thread may also have interdependencies, and therefore some execution opportunities may be missed while instructions from both the first and second threads are waiting for instructions to complete.

Adding additional threads may allow for more execution opportunities to be used. However, with more simultaneous threads, complexity increases. Complexity may result in increased design effort, increased die area, and increased power consumption. To reduce complexity, various resources of the processor are partitioned. For example only, an instruction cache may be partitioned into sections each corresponding to one of the threads.

SUMMARY

A microprocessor includes a front end module and a schedule queue module. The front end module is configured to retrieve first instructions, corresponding to a first thread, from an instruction cache, and retrieve second instructions, corresponding to a second thread, from the instruction cache. The front end module is also configured to decode the first instructions into first decoded instructions, and decode the second instructions into second decoded instructions. The schedule queue module is configured to selectively store the first decoded instructions and the second decoded instructions from the front end module and, for each stored decoded instruction, selectively issue the stored decoded instruction to an execution module. The schedule queue is further configured to reject storing an additional one of the first decoded instructions from the front end module in response to a count of the stored first decoded instructions in the schedule queue module exceeding a threshold.

A method of operating a microprocessor includes retrieving first instructions, corresponding to a first thread, from an instruction cache, and retrieving second instructions, corresponding to a second thread, from the instruction cache. The method further includes decoding the first instructions into first decoded instructions and decoding the second instructions into second decoded instructions. The method also includes selectively storing the first decoded instructions and the second decoded instructions in a schedule queue, including rejecting storage of an additional one of the first decoded instructions in the schedule queue in response to a count of the stored first decoded instructions in the schedule queue exceeding a threshold. The method further includes, for each stored decoded instruction, selectively issuing the stored decoded instruction to an execution unit.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIGS. 3A-3E are graphical illustrations of example schedule queue configurations.

In the drawings, reference numbers may be reused to identify similar and/or identical elements.

DESCRIPTION

Figure 1A:
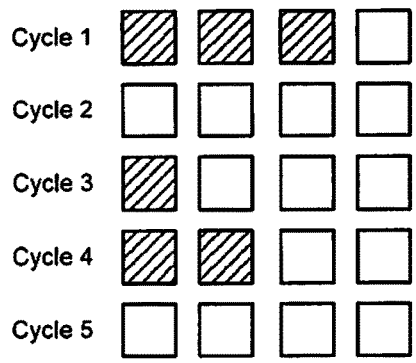
FIGS. 1A-1C are graphical illustrations of execution opportunities in different implementations of a superscalar processor architecture.
Figure 1A:
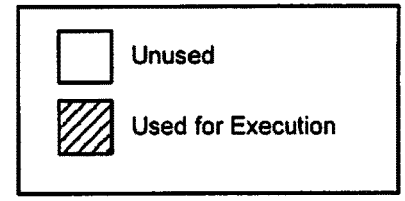
Figure 1B:
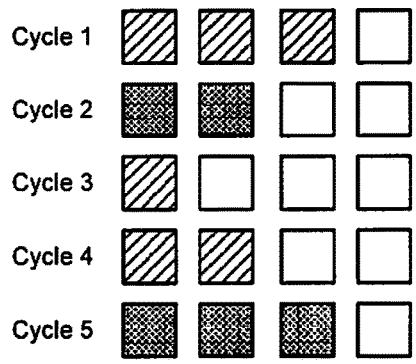
Figure 1B:
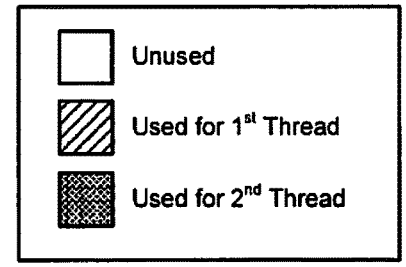
Figure 1C:
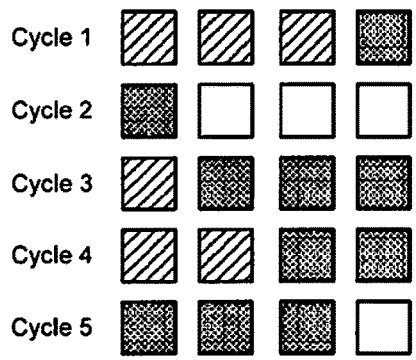
Figure 1C:
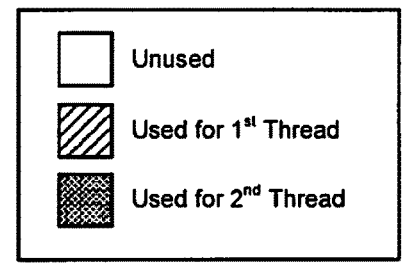

In an out-of-order processor, instructions can be executed in any order as long as dependencies are satisfied and the instructions are retired (that is, changes produced by the instructions are committed) in order. In other words, if two instructions operate on different data and do not depend on each other, those instructions can be executed in either order or potentially at the same time. In various implementations, an instruction can even be issued speculatively before that instruction's dependencies are satisfied. If the dependencies are not satisfied by the time of execution, the instruction may be reissued.

In many microarchitectures, there are a limited number of architectural registers (temporary storage locations) available to assembly instructions, and therefore to compiler writers. When a single architectural register is used in two different portions of code, it is sometimes the case that information is not shared between those two portions of code via that register and therefore one or both of those registers could be changed to a different register.

For example only, if a first section of code calculates a value, places that value in a register, and then stores that register value into memory, while a second section of code calculates a second value, places the second value in the register, and then stores that register value into memory, there is no need for both portions of code to use the same physical register. The situation where these two sections of code use the same register but do not actually depend on the register being the same is referred to as a false dependency.

By renaming registers—i.e., assigning the same architectural register to a different physical register in different sections of the code—false dependencies can be removed and portions of code can be run in parallel that would have otherwise appeared to depend on each other. False dependencies can also exist with memory locations (i.e., between stores and loads to the same memory address). Dependency management for memory locations may be implemented that is similar to the dependency management for registers.

Once instructions have been processed, including being fetched, decoded, and been subject to register renaming, instructions can be scheduled for execution. Because there are a limited number of execution units in any given processor, the instructions may be placed in a queue for later execution.

Execution units may include arithmetic logic units, such as integer and floating point arithmetic units, memory access units (sometimes referred to as load/store units), and branch units. In addition, different execution units may handle different types of data and/or different types of instructions. For example, certain execution units may be capable of servicing single instruction multiple data (SIMD) instructions that operate on multiple pieces of data at once. Further, different execution units may handle different precisions of floating point numbers, such as single-precision and double-precision.

Each execution unit may be supplied by one schedule queue. In various implementations, one or more schedule queues may supply instructions to multiple execution units. In various implementations, a single schedule queue may supply instructions to all of the execution units. For simplicity of explanation only, the present disclosure will depict a 1-to-1 relationship between schedule queues and execution units.

To reduce complexity, and to evenly service multiple threads, each schedule queue is traditionally partitioned among the various threads. For example, in a four-thread simultaneous multithreading processor, each of the schedule queues may be partitioned into four sections, each section corresponding to one of the four threads. While this promotes simplicity, both conceptually for chip designers and compiler writers and in terms of hardware complexity, partitioning the schedule queues may unnecessarily restrict processor throughput.

For example, if only one of the threads is currently making use of a particular execution unit, the partitions in the corresponding schedule queue allocated to other threads may be empty. The space of the schedule queue is therefore unnecessarily restricted for the thread exclusively using that execution unit. By allowing that thread to use more of the schedule queue, a greater number of instructions are available to be scheduled and therefore more possibilities for taking advantage of instruction level parallelism will be present.

According to the present disclosure, schedule queues are created to be partition-free. Although partition-free, in various implementations some limits may be placed on a thread's usage of a schedule queue. For example, a single thread may be prevented from occupying more than a predetermined proportion of a schedule queue. For example only, the upper limit of how much of a schedule queue a single thread can use may be set so that a predetermined number, such as 1 or 2, of instructions from other queues can still be placed in the schedule queue.

In other implementations, a predetermined portion, such as 1 or 2 instructions, of a schedule queue may be reserved for each of the threads. This guarantees that each of the threads will at least have access to that predetermined portion of the schedule queue. Further, if one thread has dominated the schedule queue, and execution of that thread has stalled, such as because of a need to access main memory (such as a level 2 or level 3 cache miss), the instructions from that thread may be purged from the schedule queue.

Figure 2:
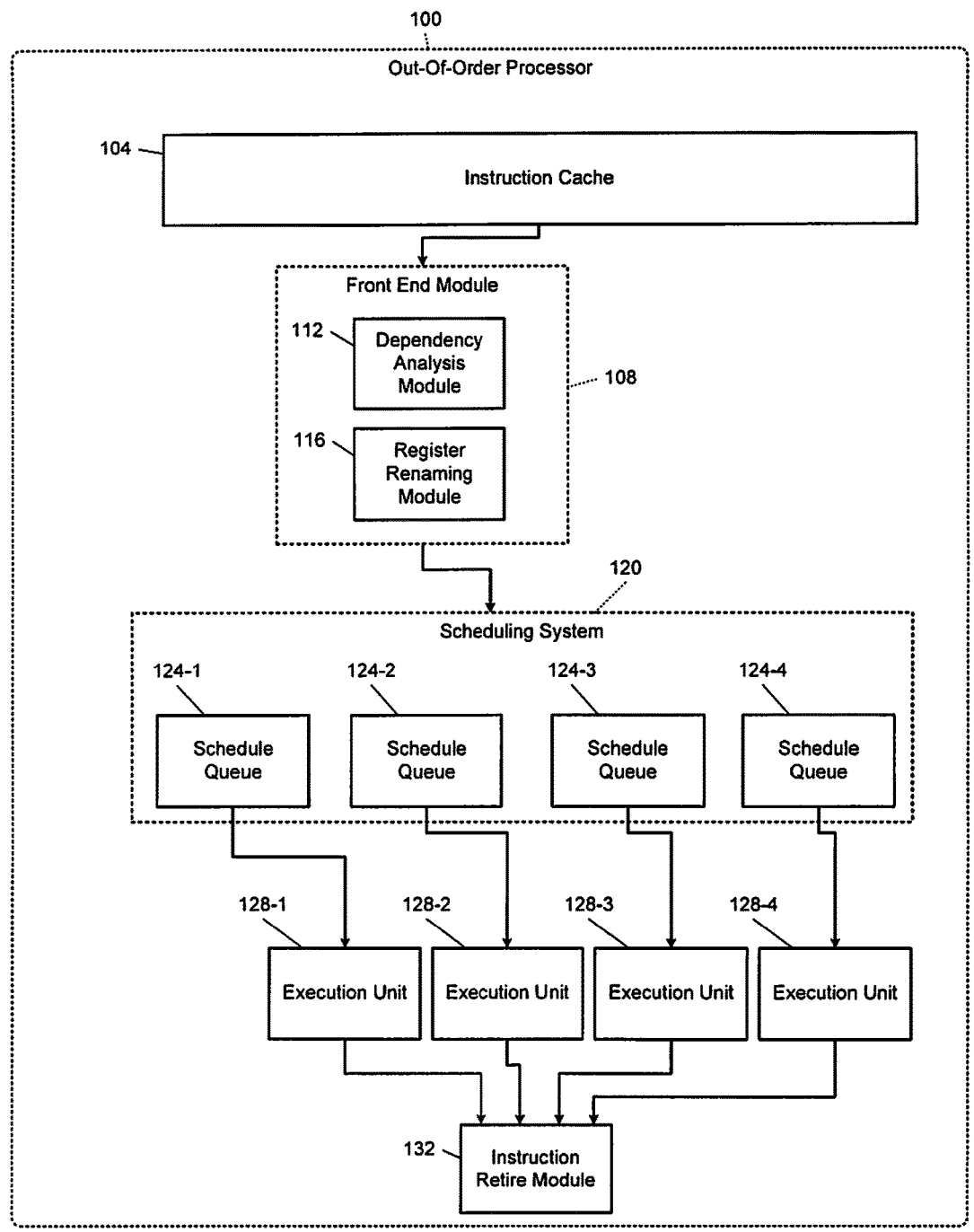
FIG. 2 is a functional block diagram of an example processor.

In FIG. 2, an example depiction of an out-of-order processor 100 is shown. For simplicity of explanation, many components and many interactions between components in an actual implementation of the out-of-order processor 100 are omitted. For example only, while an instruction cache 104 is shown, a corresponding data cache is not shown. In addition, no register file is shown, no graphics processing is shown, no branch prediction is shown, etc.

A front end module 108 retrieves instructions from the instruction cache 104. The front end module 108 may maintain a program counter (PC) for each thread to determine which instructions to fetch next. The front end module 108 includes a dependency analysis module 112 configured to recognize instruction level parallelism. The dependency analysis module 112 may control a register renaming module 116, which renames architectural registers in the instructions to physical registers of the out-of-order processor 100. Although not shown, the front end module 108 may perform additional functions, such as decoding and converting instructions into micro-operations.

A scheduling system 120 receives instructions from the front end module 108 and selectively stores the instructions in a schedule queue 124. In the example implementation of FIG. 2, there are four schedule queues 124-1, 124-2, 124-3, and 124-4 (collectively, schedule queues 124). Each of the schedule queues 124 corresponds to a respective execution unit 128-1, 128-2, 128-3, and 128-4 (collectively execution units 128). Each of the execution units 128 may handle a different type of instruction. Alternatively, multiple of the execution units 128 may handle similar instructions. In such cases, those execution units 128 may share a single schedule queue 124. As described above, a single one of the schedule queues 124 may be used in place of the multiple schedule queues 124.

The schedule queues 124 supply instructions to the respective execution units 128 when dependencies of those instructions are satisfied. For example only, if one instruction uses data from a register that will be written by a prior instruction, the schedule queue will wait to issue the instruction until the result of the prior instruction is either committed to the register file or is available through a bypass mechanism. An instruction retire module 132 commits changes made by instructions in the execution units 128 to respective registers and memory locations. The instruction retire module 132 may require that instructions be retired in their original program order so that changes are not incorrectly made after a branch misprediction or when servicing an interrupt.

In FIG. 3A, an example set of six conventionally-partitioned schedule queues 200 is shown. Each of the schedule queues is partitioned so that a first portion is dedicated to a first thread and a second portion is dedicated to a second thread. A first entry 204-1 in one of the schedule queues 200 may store a single instruction or micro-operation corresponding to the first thread. An entry 204-10 stores an instruction or micro-operation corresponding to the second thread. For example only, the schedule queues 200 are shown with 18 entries (collectively, entries 204), with half dedicated to the first thread and half dedicated to the second thread.

In various implementations, the schedule queues 200 may be of different sizes. For example only, a schedule for integer operation may be larger than a schedule queue for floating point operations. In addition, the size of the entries 204 may be different. For example, the size of an entry for a schedule queue corresponding to a load/store execution unit may be smaller than an entry for a schedule queue corresponding to a floating point execution unit.

In FIG. 3B, partition-free schedule queues 210 are shown for which each of the entries is available for any thread. In this implementation, there is no limit on single threads, and therefore a single thread may, at various times, occupy an entire one of the schedule queues 210.

In FIG. 3C, schedule queues 220, in which each entry can be used for any thread, have limits on how many entries can be used by a single thread. As the legend indicates, a single thread may be able to use all of the entries of the schedule queue except for a single entry. The upper threshold on how many entries a given thread can use may be equal to the total number of entries in the schedule queue minus one, as shown here, or may be lower. Although shown in FIG. 3C as being the same, each of the schedule queues 220 may have a different size and may have different thresholds set for how many entries can be used by a single thread.

Figure 3E:
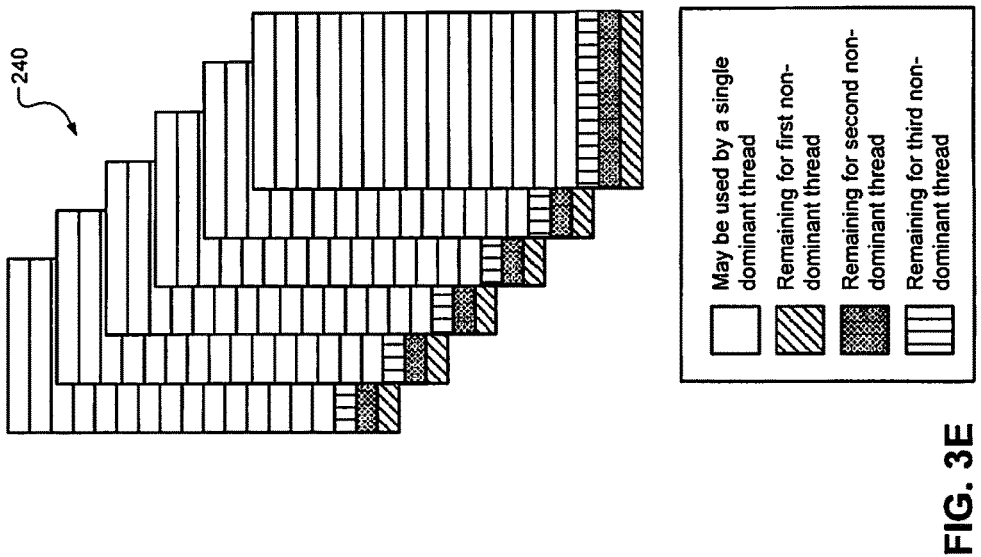
Figure 3D:
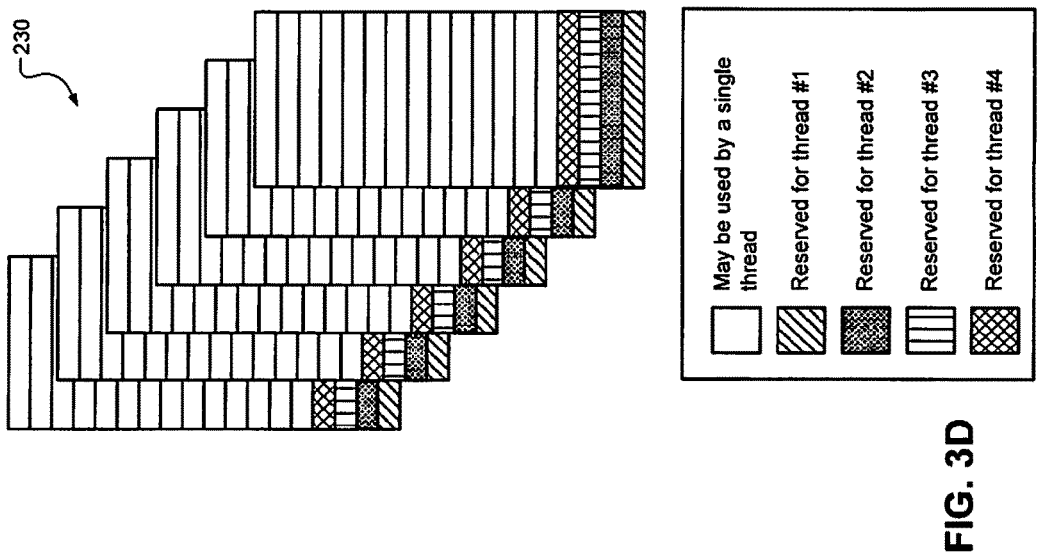

In FIG. 3D, schedule queues 230 are shown for a 4-thread microarchitecture. Each of the schedule queues 230 has one or more entries reserved for a first thread, one or more entries reserved for a second thread, one or more entries reserved for a third thread, and one or more entries reserved for a fourth thread. The unreserved entries can be used by any thread and may, depending on thread execution, all be used by a single thread at various times.

In FIG. 3E, schedule queues 240 include entries that can be used for any of four threads—the number four is used for example only, and can be higher or lower in a given implementation. The number of entries that can be used by a single dominant thread is limited such that there are one or more entries remaining for a first non-dominant thread, one or more entries remaining for a second non-dominant thread, and one or more entries remaining for a third non-dominant thread. As program execution progresses, different threads may become the dominant thread, occupying a majority of the queue.

In various implementations, multiple schedule queues in a processor may be implemented according to a combination of one or more of FIGS. 3A-3E. Selection of schedule queue implementations may be determined based on empirical performance evidence when running various workloads on a processor or a processor simulator. Processors designed for consumers may lend themselves to different schedule queue implementations than processors for other systems, such as transactional servers or web servers. In various implementations, schedule queue behavior can be changed while the processor is running, such as by setting processor configuration registers. As a result, compiler writers may be able to take advantage of different schedule queue implementations.

Figure 4:
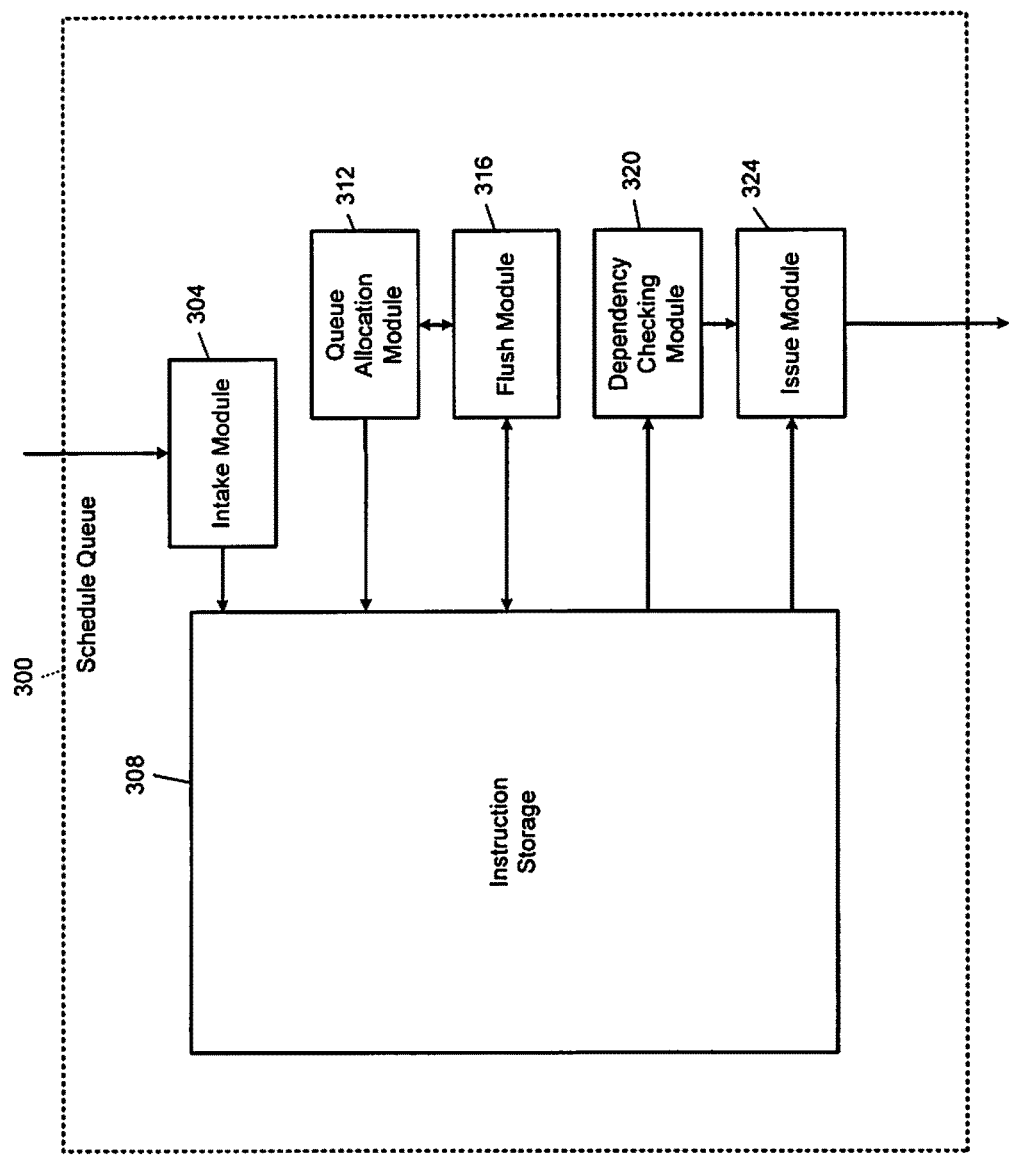
FIG. 4 is a functional block diagram of an example schedule queue.

In FIG. 4, a simplified example of a schedule queue 300 according to the present disclosure is shown. An intake module 304 receives instructions from a front end module, such as the front end module 108 of FIG. 2, and selectively places those instructions in instruction storage 308. Whether those instructions are stored in the instruction storage 308 may be determined by a queue allocation module 312. The queue allocation module 312 determines how much of the instruction storage 308 is being used by each thread and instructs the intake module 304 to discard instructions that would violate the limits on the schedule queue.

A flush module 316 may flush (that is, delete) all or portions of the instruction storage 308 based on stall events and/or usage timing as described in more detail below. In brief, the flush module 316 may remove instructions corresponding to a certain thread from the instruction storage 308 when that thread has stalled or when that thread has occupied a majority of the instruction storage 308 for too long a period of time. A dependency checking module 320 evaluates instructions in the instruction storage 308 and determines when dependencies have been satisfied and the instruction can therefore be issued to an execution unit by an issue module 324.

Figure 5A:
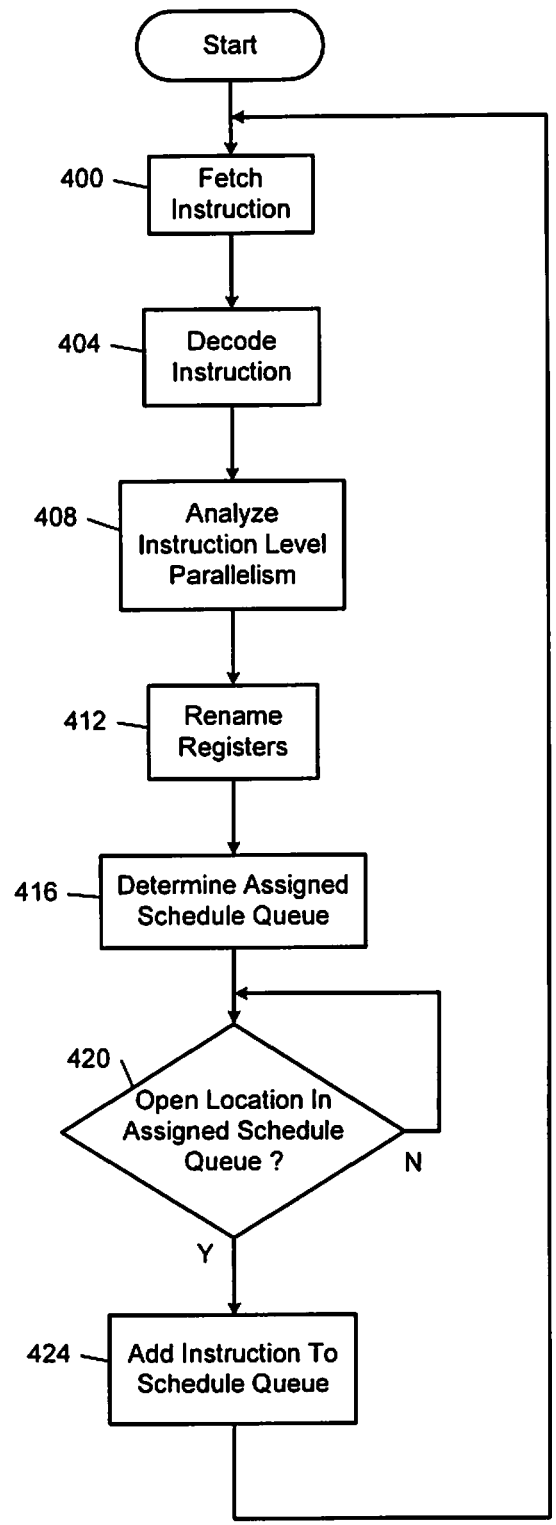
FIGS. 5A-5B are flowcharts showing example instruction processing.

In FIG. 5A, simplified control for instruction intake begins at 400, where instruction corresponding to the program counter is fetched. At 404, the instruction is decoded. At 408, instruction level parallelism is analyzed for the decoded instruction as well as the instructions before and after the decoded instruction. At 412, architectural registers are renamed to eliminate false dependencies and at 416, control determines a schedule queue to which the decoded instruction will be assigned.

At 420, control determines whether there is an open location in the assigned schedule queue. If so, control transfers to 424; otherwise, control remains at 420. The control of FIG. 5A may be executed separately for each thread. Therefore, although control at 420 may be waiting to provide an instruction to a schedule queue, instructions from other threads may make forward progress if schedule queue entries for their instructions are available. At 424, control adds the instruction to the schedule queue and control returns to 400.

Figure 5B:
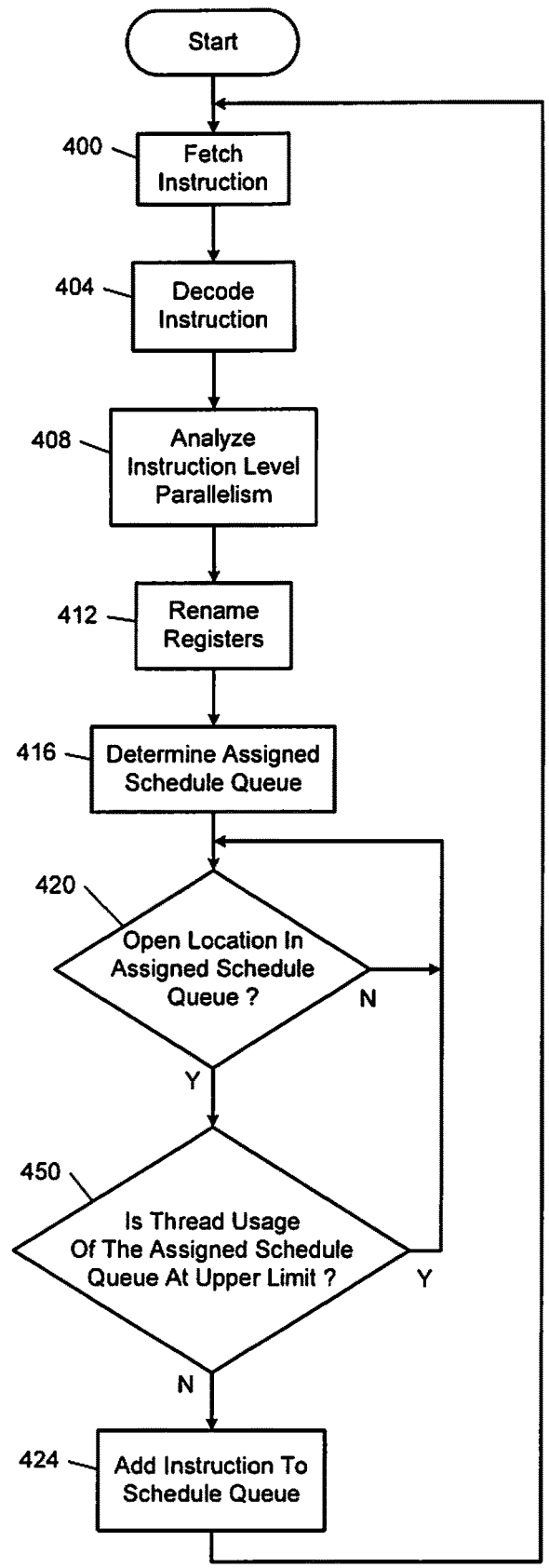

In FIG. 5B, a limit is enforced on the schedule queue so that a single thread does not fill up the entire schedule queue. Therefore, at 420, if there is an open location in the assigned schedule queue, control transfers to 450. At 450, control determines whether thread usage of the assigned schedule queue is at an upper limit. If so, control returns to 420; otherwise, control continues at 424.

Figure 6A:
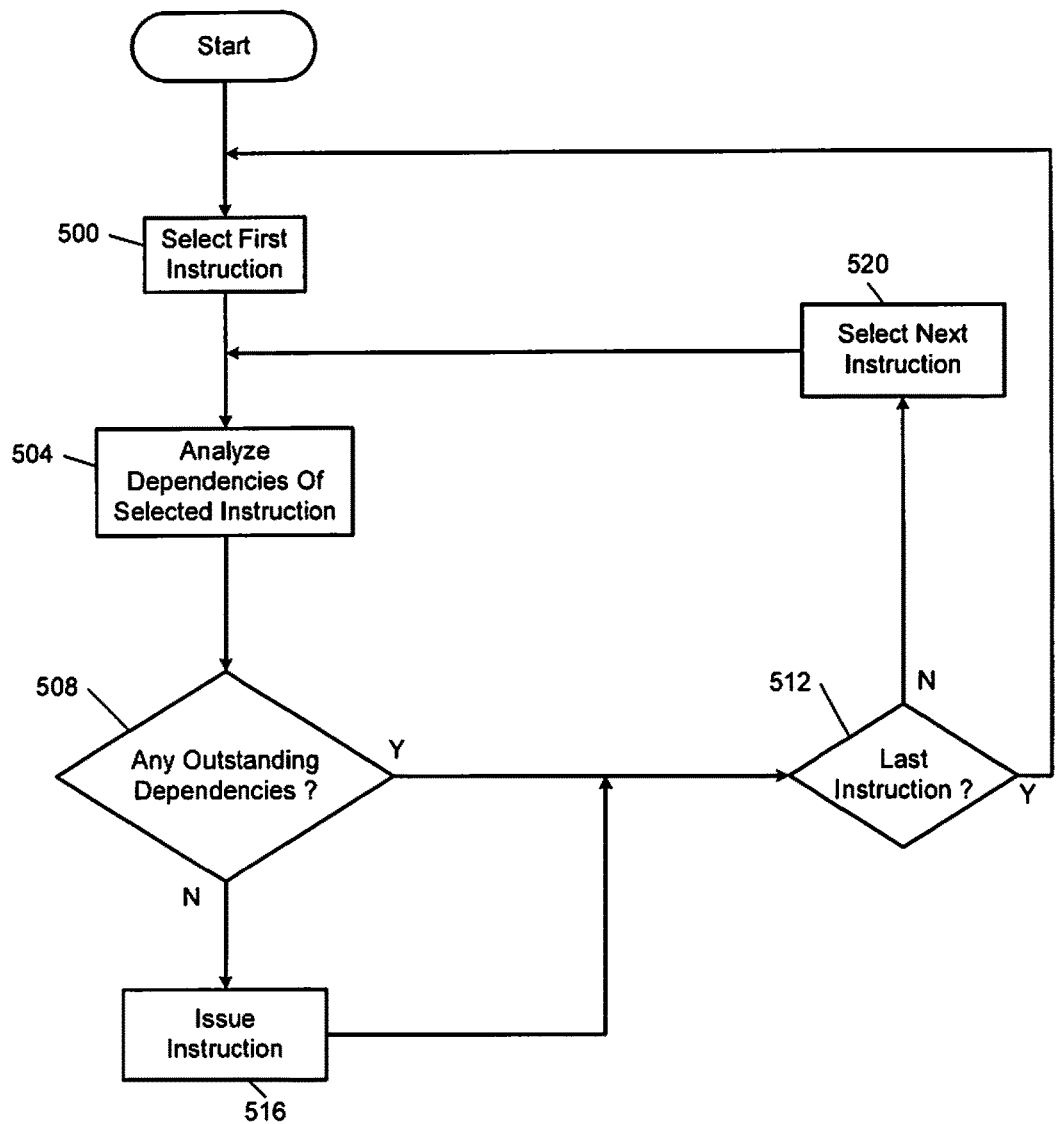
FIGS. 6A-6D are flowcharts showing example control of a schedule queue.

In FIG. 6A, an example operation of a schedule queue begins at 500, where a first instruction stored by the schedule queue is selected. At 504, control analyzes dependencies of the selected instruction. At 508, if there are any outstanding dependencies, control transfers to 512; otherwise, there are no outstanding dependencies and control transfers to 516. At 516, control issues the instruction and continues at 512. At 512, control determines whether the selected instruction is the last instruction. If so, control transfers to 500, where the first instruction is selected and the process is repeated. Otherwise, control transfers to 520. At 520, the next instruction is selected and control continues at 504.

Although FIG. 6A presents dependency analysis and issue for a schedule queue in an iterative, linear fashion for simplicity, in various implementations instructions in the schedule queue may be assessed in any order or, for that matter, in parallel. For example, dependencies for some or all of the instructions in the schedule queue may be evaluated in parallel, and instructions whose dependencies are satisfied are available for issuance.

Further, instructions may be added to the schedule queue as dependencies are added, and therefore the abstraction of a first instruction, a next instruction, and a last instruction may be in a state of flux. Issue order may not be dependent on order of the instructions in the schedule queue or on program order (the actual order of instructions according to the program counter). For example, to reduce complexity, the schedule queue may have an incomplete view of program order, and therefore issue instructions in an order unrelated to program order.

In various implementations, instructions with certain dependencies may be executed speculatively, in the hope that the dependencies will be resolved by the time the instruction reaches the execution stage. If not, the speculatively-executed instruction may remain in the schedule queue for future issuance.

Figure 6B:
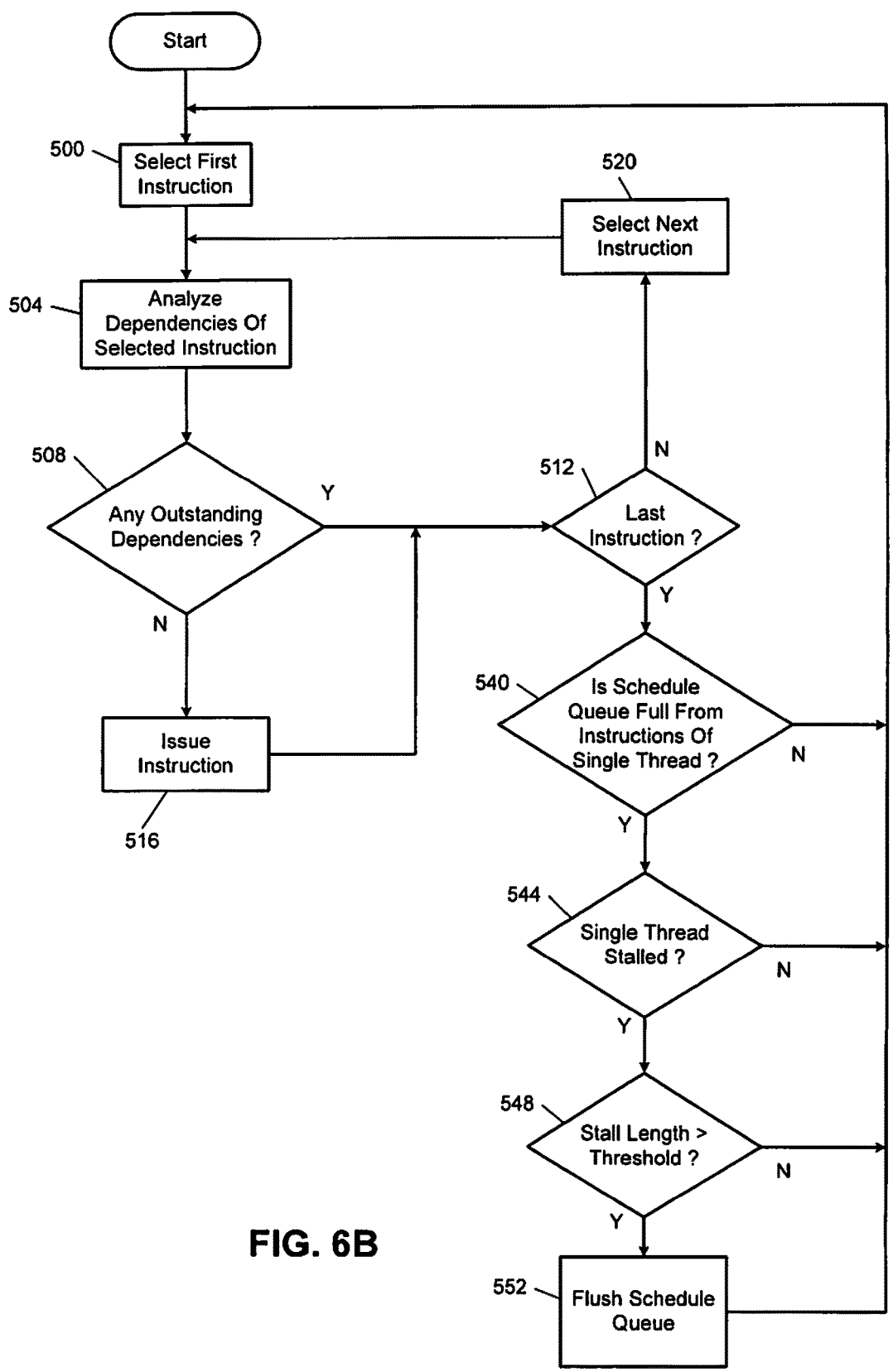

In FIG. 6B, schedule queue operation incorporating flushing is shown. At 512, if the selected instruction is the last instruction, control transfers to 540. At 540, control determines whether the schedule queue is full from instructions corresponding to a single thread. If so, control transfers to 544; otherwise, control returns to 500. Full may mean that the entire schedule queue is occupied by instructions from the single thread. Alternatively, full may mean that the maximum number of instructions from a given queue, which may be less than the total size of the schedule queue, are currently stored in the schedule queue.

At 544, control determines whether the single thread is stalled. If so, control transfers to 548; otherwise, control returns to 500. At 548, control determines whether the expected length of the stall is greater than a threshold. If so, control transfers to 562; otherwise, control returns to 500. The threshold may be set so that an access to main memory is a sufficiently long stall that the schedule queue should be flushed, while a stall related to accessing a cache, such as level 2 cache, will be less than the threshold. Alternatively, instead of using a predicted stall time, the type of stall can be evaluated. Accordingly, the queue may be flushed in response to stalls related to off-chip memory access, but not for on-chip memory access. At 552, control flushes the schedule queue and returns to 500. All of the entries in the schedule queue may be flushed or only entries corresponding to the single thread may be flushed.

As discussed in connection with FIG. 6A, the abstraction of first instruction, next instruction, and last instruction may not map exactly to hardware implementations. As a result, the evaluation of the schedule queue with respect to a single thread (at 540-548) may be performed asynchronously to dependency analysis and issuance (500-520). Similarly, in FIGS. 6C and 6D below, evaluation of the schedule queue in terms of whether instructions from a single thread are dominating the schedule queue may be performed asynchronously from any issuance or dependency analysis.

Figure 6C:
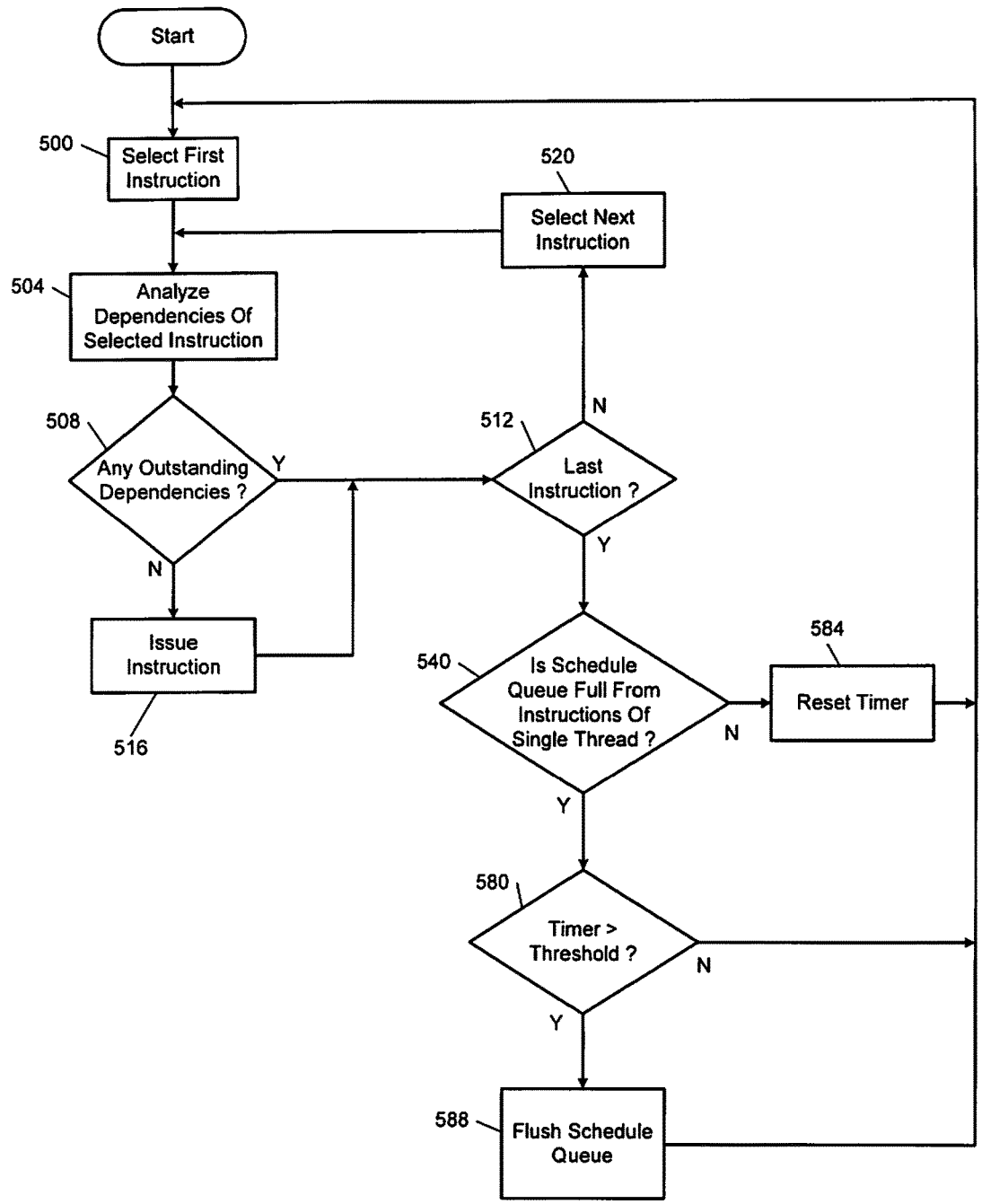

In FIG. 6C, the schedule queue maintains a timer indicating how long a single thread has occupied the schedule queue. At 540, control determines whether the schedule queue is full from instructions of a single thread. If so, control transfers to 580; otherwise, control transfers to 584. At 580, control determines whether the timer is greater than a threshold. If so, control transfers to 588, where the schedule queue is flushed and control returns to 500; otherwise, control returns directly to 500. At 584, the schedule queue is not full from instructions of a single thread and therefore the timer is reset. Control then returns to 500.

Figure 6D:
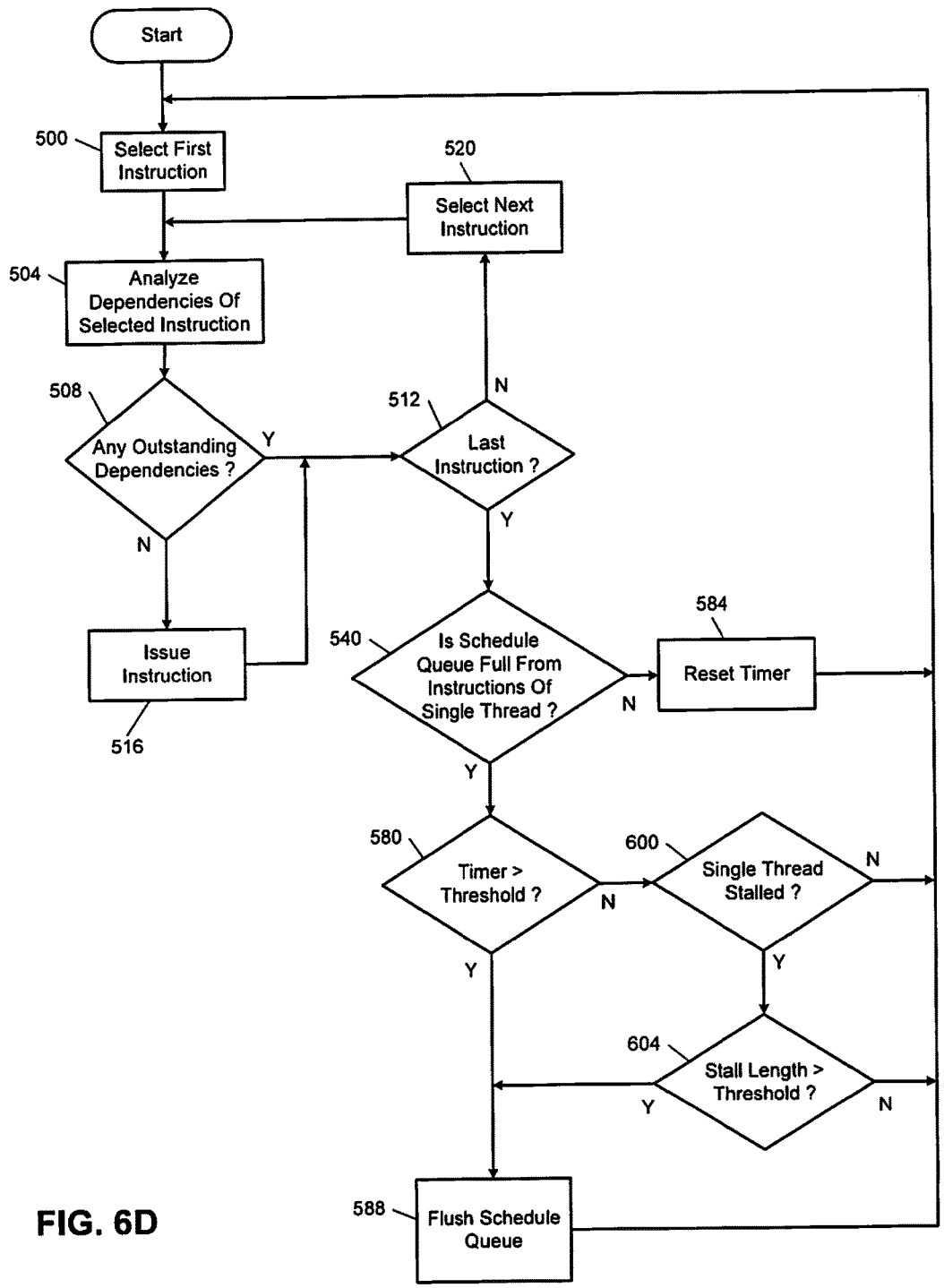

In FIG. 6D, the schedule queue responds to either a timer or an event when determining whether to flush the schedule queue. At 580, if the timer is greater than a threshold, control transfers to 588, where the schedule queue is flushed and control returns to 500. Otherwise, control transfers to 600. If the single thread has stalled at 600, control transfers to 604; otherwise, control returns 500. At 604, control determines whether the expected stall length is greater than the predetermined threshold. If so, control transfers to 588 to flush the schedule queue; otherwise, control returns to 500. Note that the threshold for the timer in 580 will be different in many implementations from the threshold for the stall length in 604.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

What is claimed is:

1. A microprocessor comprising:
    a front end module configured to
        retrieve first instructions, corresponding to a first thread, from an instruction cache,
        retrieve second instructions, corresponding to a second thread, from the instruction cache,
        decode the first instructions into first decoded instructions, and
        decode the second instructions into second decoded instructions; and
    a schedule queue module configured to
        selectively store the first decoded instructions and the second decoded instructions from the front end module for future issuance, and
        for each stored decoded instruction, selectively issue the stored decoded instruction to an execution module,
    wherein the schedule queue module is configured to reject storing an additional one of the first decoded instructions from the front end module in response to a count of the stored first decoded instructions in the schedule queue module exceeding a first threshold,
    wherein the first threshold is smaller than a total number of instructions that the schedule queue module is capable of storing, and
    wherein the first threshold is based on a difference between (i) the total number of instructions and (ii) a total number of threads serviced by the front end module.

2. The microprocessor of claim 1, wherein the schedule queue module is configured to, for each stored decoded instruction, issue the stored decoded instruction to the execution module in response to dependencies being resolved for the stored decoded instruction.

3. The microprocessor of claim 1, wherein the schedule queue module is configured to reject storing an additional one of the second decoded instructions in response to a count of the stored second decoded instructions in the schedule queue module exceeding the first threshold.

4. The microprocessor of claim 1, further comprising the execution module, wherein the execution module comprises an arithmetic logic unit or a memory access unit.

5. The microprocessor of claim 1, wherein the schedule queue module is configured to flush the stored first decoded instructions in response to both (i) the stored first decoded instructions experiencing a stall condition and (ii) the count of the stored first decoded instructions in the schedule queue module exceeding a second threshold.

6. The microprocessor of claim 5, wherein the second threshold is lower than the first threshold.

7. The microprocessor of claim 5, wherein the stall condition comprises a second level cache miss for one of the stored second decoded instructions.

8. The microprocessor of claim 5, wherein the schedule queue module is configured to flush the stored first decoded instructions also in response to (i) the count of the stored first decoded instructions exceeding a third threshold (ii) for longer than a predetermined time.

9. The microprocessor of claim 1, wherein the schedule queue module is configured to flush the stored first decoded instructions in response to (i) the count of the stored first decoded instructions exceeding a second threshold (ii) for longer than a predetermined time.

10. The microprocessor of claim 9, further comprising a timer configured to track a time that the count of the stored first decoded instructions exceeds the second threshold.

11. The microprocessor of claim 1, wherein the microprocessor is configured to execute a plurality of threads including the first thread, the second thread, and at least one additional thread.

12. The microprocessor of claim 1, wherein the front end module is configured to, for selected ones of the first instructions, generate multiple first decoded instructions for each of the selected ones of the first instructions.

13. A method of operating a microprocessor, the method comprising:
    retrieving first instructions, corresponding to a first thread, from an instruction cache;
    retrieving second instructions, corresponding to a second thread, from the instruction cache;
    decoding the first instructions into first decoded instructions;
    decoding the second instructions into second decoded instructions;
    selectively storing the first decoded instructions and the second decoded instructions in a schedule queue for future issuance, wherein the selectively storing includes rejecting storage of an additional one of the first decoded instructions in the schedule queue in response to a count of the stored first decoded instructions in the schedule queue exceeding a first threshold, wherein the first threshold is smaller than a total number of instructions that the schedule queue is capable of storing; and
    for each stored decoded instruction, selectively issuing the stored decoded instruction from the schedule queue to an execution unit,
    wherein the first threshold is based on a difference between (i) the total number of instructions and (ii) a total number of threads serviced by the schedule queue.

14. The method of claim 13, wherein the selectively issuing includes, for each stored decoded instruction, issuing the stored decoded instruction to the execution unit in response to dependencies being resolved for the stored decoded instruction.

15. The method of claim 13, further comprising flushing the stored first decoded instructions in response to both (i) the stored first decoded instructions experiencing a stall condition and (ii) the count of the stored first decoded instructions in the schedule queue exceeding a second threshold.

16. The method of claim 13, further comprising flushing the stored first decoded instructions from the schedule queue in response to (1) the count of the stored first decoded instructions exceeding a second threshold (ii) for longer than a predetermined time.

17. The method of claim 15, wherein the second threshold is lower than the first threshold.

18. The method of claim 15, wherein the stall condition comprises a second level cache miss for one of the stored second decoded instructions.

19. The method of claim 15, further comprising flushing the stored first decoded instructions also in response to (i) the count of the stored first decoded instructions exceeding a third threshold (ii) for longer than a predetermined time.

20. The method of claim 13, further comprising generating, for selected ones of the first instructions, multiple first decoded instructions for each of the selected ones of the first instructions.

\* \* \* \* \*